United States Patent [19]

Roche et al.

[11] Patent Number: 5,410,538
[45] Date of Patent: Apr. 25, 1995

[54] METHOD AND APPARATUS FOR TRANSMITTING SIGNALS IN A MULTI-TONE CODE DIVISION MULTIPLE ACCESS COMMUNICATION SYSTEM

[75] Inventors: James R. Roche, New Providence; Aaron D. Wyner, Maplewood, both of N.J.

[73] Assignee: AT&T Corp., Murray Hill, N.J.

[21] Appl. No.: 149,430

[22] Filed: Nov. 9, 1993

[51] Int. Cl.6 .................... H04J 1/00; H04J 13/00; H04B 7/216
[52] U.S. Cl. ...................... 370/18; 370/69.1; 375/205; 379/59; 455/33.1; 455/54.1
[58] Field of Search ............ 370/18, 19, 20, 21, 370/23, 69.1, 120, 121, 123, 70, 76; 375/1; 379/59, 60, 63; 455/33.1, 33.4, 54.1, 56.1

[56] References Cited

U.S. PATENT DOCUMENTS

| | | | |
|---|---|---|---|
| 5,111,534 | 5/1992 | Benner | 379/59 X |
| 5,243,598 | 9/1993 | Lee | 379/60 X |
| 5,267,261 | 11/1993 | Blakeney, II et al. | 379/60 X |
| 5,295,153 | 3/1994 | Gudmundson | 370/18 X |
| 5,307,341 | 4/1994 | Yates et al. | 370/18 |

OTHER PUBLICATIONS

U. Timor, "Multi-Tone Frequency-Hopped MFSK System for Mobile Radio", *Bell System Technical Journal*, vol. 61, No. 10, pp. 3007–3017, Dec. 1982.

L. J. Cimini, Jr., "Analysis and Simulation of a Digital Mobile Channel Using Orthogonal Frequency Division Multiplexing", *IEEE Transactions on Cummunications*, vol. COM-33, No. 7, Jul. 1985.

N. Livneh, R. Meidan, M. Ritz, G. Silbershatz, "Frequency Hopping CDMA for Cellular Radio", *Proceedings of the International Commsphere Symposium*, Herzliya, Israel, Dec. 1991.

Primary Examiner—Melvin Marcelo
Attorney, Agent, or Firm—Michele L. Simons

[57] ABSTRACT

A method of transmitting signals from a mobile unit to a base station in the reverse link direction using multitone techniques includes the step of dividing a frequency band into a plurality of generally even spaced tones. The tones are partitioned into a predetermined number of tone sets which each contain a predetermined number of tones. Each unit within a given sector is assigned a tone set for transmitting information signals. The tones within each tone set are selected so that the modulated signals transmitted by each unit are orthogonal with respect to all other tone sets assigned to units in that sector. Adjacent cells have no more than one tone in common.

20 Claims, 2 Drawing Sheets

METHOD AND APPARATUS FOR TRANSMITTING SIGNALS IN A MULTI-TONE CODE DIVISION MULTIPLE ACCESS COMMUNICATION SYSTEM

BACKGROUND OF THE INVENTION

The present invention relates generally to cellular and other types of wireless communication systems, and more particularly, to code division multiple access (CDMA) systems which use multiple-tone modulation to achieve a wide-band signal with minimal intra-cell and intra-sector interference.

Of particular interest in cellular systems and other types of wireless communication systems are bandwidth-efficient multiple access schemes. Typical systems comprise a plurality of cells or designated regions, a base station associated with each cell and a plurality of mobile units. These systems require modulation schemes which efficiently use an allocated frequency band so that a maximum number of mobile units can be accommodated with a minimum amount of interference. Different modulation schemes have been developed for transmitting information signals from a mobile unit to a base station, (i.e., reverse or uplink direction) and from a base station to a mobile unit (i.e., forward or downlink direction). Communication in the uplink direction is particularly difficult because a base station must be able to receive, and distinguish among all of the information signals transmitted from those mobile units located within its particular cell. The quality of transmission of the information signals in the uplink direction depends in part on the amount of bandwidth allocated for transmission and the number of mobile units to be accommodated in a given cell.

Among the modulation schemes proposed is frequency hop spread spectrum modulation. Each mobile unit is assigned a so-called hopping sequence which modulates the information signals transmitted by the unit at a particular set of frequencies for a predetermined amount of time and then "hops" to another set of frequencies. (The number of frequencies in a set could be as small as "1").

An example of a frequency hopping system is discussed in U. Timor, "Multi-Tone Frequency-Hopped MFSK System for Mobile Radio", *Bell System Technical Journal*, Vol. 61 No. 10, pp. 3007–3017, Dec. 1982. In the Timor system, each unit modulates information signals by a set of tones that are unique to the unit and to which a frequency-hopping sequence is applied. The signals received by the base station are a composite of the tone sequences assigned to each of the mobile units within a cell. Each link between a mobile unit and a base station is identified by an address word. The base station periodically performs a spectral analysis of the received signals. Based on the spectral analysis, the base station generates a frequency-time received energy matrix. A decoded matrix for a particular mobile unit is obtained by subtracting the address word from the matrix. Information signals are transmitted in the downlink direction from the base station to the mobile unit by modulating the information signals by the tone set assigned to the mobile unit. This system, however, is complicated by the requirement that the base station continually update the particular frequency-hopping sequence applied to the information signals transmitted by each mobile unit.

A more common modulation scheme is CDMA. CDMA systems broadcast all channels in the system in a common frequency band. Therefore, the time and frequency domains are shared by all the units within the cell simultaneously. One particular type of CDMA which is gaining widespread use is that of direct sequence CDMA (DS-CDMA). In DS-CDMA systems, information signals from each mobile unit are multiplied by a pseudo-noise (PN) sequence prior to RF modulation. Each mobile unit uses a unique PN sequence, referred to as a signature sequence. As a result, it is possible for the base station to isolate, and therefore recover the information signals from, the various mobile units.

In general, the extent to which each mobile unit is able to be assigned a o unique PN sequence is a function of the extent to which the PN sequences assigned to a cell are mutually orthogonal. Orthogonal signals are signals which have a cross-correlation coefficient of zero. In a given DS-CDMA cellular system with a given bandwidth and a large number of units, it may not be possible to provide for all units within a cell a set of signature sequences which are mutually orthogonal to each other. If a completely mutually orthogonal set of signature sequences is not available for all units in a cell, multiple access interference results. This may be thought of as a type of "cross-talk" which results from an inability to completely isolate a desired information signal from all other transmitted signals in the cell.

The multiple access interference seen by a particular unit is approximately proportional to the number of units in the DS-CDMA system. Because of the growing popularity of cellular and other wireless systems, there is a need to maximize the number of mobile units capable of transmitting in a cell without producing a corresponding increase in the degree of multiple access interference or other communication errors.

SUMMARY OF THE INVENTION

In accordance with the present invention, the frequency band used to transmit information signals between a plurality of mobile units and a base station is partitioned into a predetermined number of tones. The tones are partitioned into a predetermined number of tone sets each containing a predetermined number of tones (K) which are distributed in the frequency band. Each mobile unit within a given sector is assigned a tone set for transmitting signals. The tone sets are assigned to each sector so that tone sets within the same sector are generally orthogonal and tone sets in adjacent sectors have at most X tones in common wherein $0 < X < K$.

DETAILED DESCRIPTION

For clarity of explanation, the illustrative embodiments of the present invention are presented as comprising individual functional blocks. The functions these blocks represent may be provided through the use of either shared or dedicated hardware, including, but not limited to, hardware capable of executing software. Illustrative embodiments may comprise digital signal processors (DSPs), such as the AT&T DSP16 or DSP32C, and software performing the operations discussed below. Very large scale integration (VLSI) hardware embodiments of the present invention, as well as hybrid DSP/VLSI embodiments, may also be provided.

Figure 1:
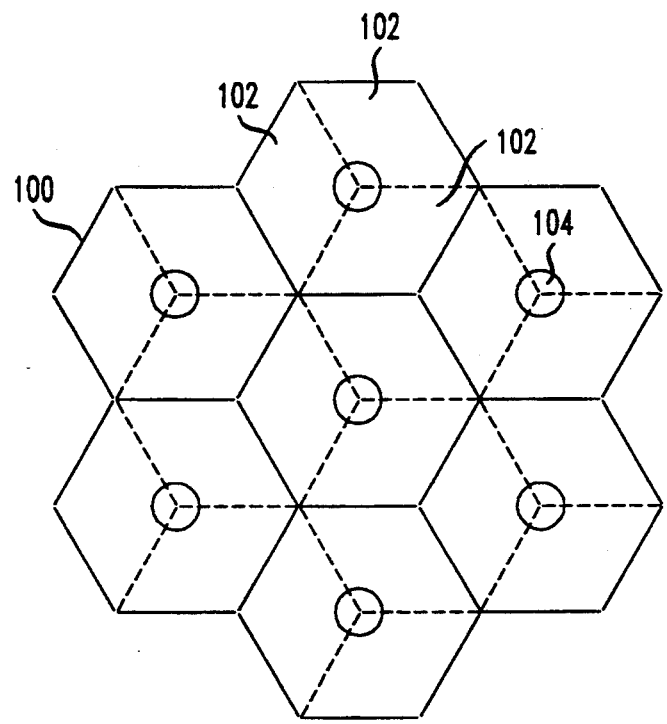
FIG. 1 is an illustrative diagram of a typical cellular arrangement.

FIG. 1 illustrates an exemplary cellular arrangement which is typically used in a cellular communication system. Each cellular region is denoted by a hexagonal cell 100 and divided into three generally equal sectors 102. The cellular region may be any particular shape such as, but not limited to square, rectangular, or triangular. Each sector supports up to a predetermined number of mobile units as will be described hereinafter. The sectors and cells correspond to a predefined land area.

As can be seen, each sector 102 has four adjacent sectors. Likewise, each cell 100 has six adjacent cells. A base station 104 is located at the center of each cell and relays the information signals to and from mobile units (not shown) located within the cell. The base station 104 could alternatively be described as being associated with each sector 102 located within the cell 100. A directional antenna (not shown) is located at the base station. The directional antenna generally has three branches, one facing each sector of the cell. Each branch of the antenna receives and transmits information signals between the mobile units within its facing sector. If a mobile unit travels from one sector to another, in either the same or a different cell, a handoff procedure is performed so that the mobile unit's information signals are transmitted from, and received by the antenna branch facing the new sector.

The present invention is directed to a modulation scheme which uses multi-tone modulation techniques to transmit information signals from a plurality of transmitters (e.g., mobile units) to a single receiver (e.g., base station). The modulation scheme can be used, for example, in cellular systems such as that depicted in FIG. 1 to transmit information signals from a plurality of mobile units to a base station in a particular cellular region or to transmit signals from a plurality of wireless communicators, such as wireless telephones, as in a wireless communication system. The modulation scheme distributes a plurality of tone sets across a frequency band designated for the transmission of the information signals in such a way that each transmitter within a particular cellular region—illustratively a sector—is assigned a unique tone set.

Figure 2:
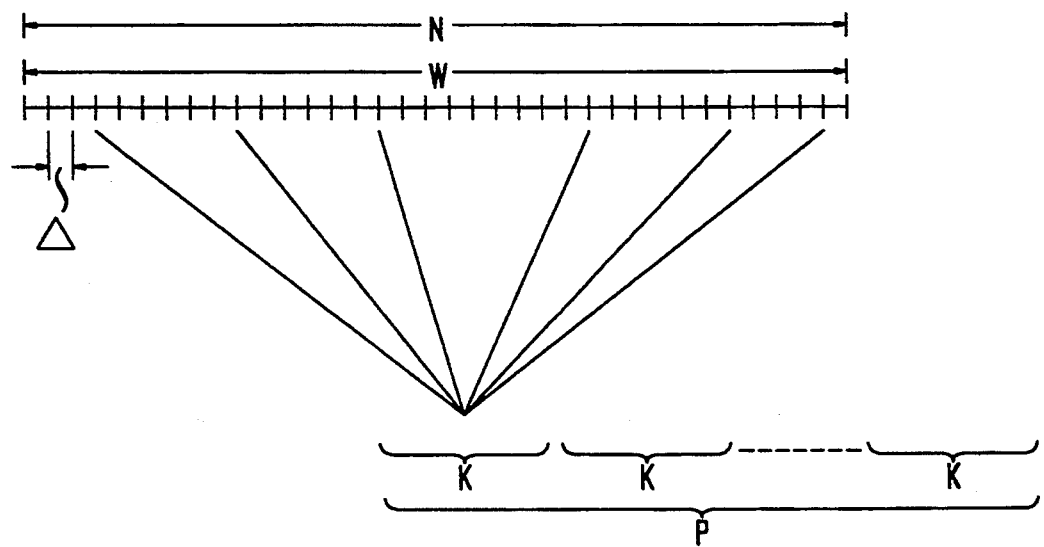
FIG. 2 is an illustrative diagram representing the bandwidth W available for transmission and the manner in which such bandwidth is subdivided in accordance with the present invention.

FIG. 2 illustrates an exemplary frequency band which can be allocated to a cellular or other wireless communication system using a multi-tone (MT) CDMA scheme embodying the principles of the present invention. In an exemplary embodiment, the bandwidth of the frequency band, W, is $1.25 \times 10^6$ Hz. Distributed across the bandwidth W are N evenly spaced frequencies or tones. The N tones are partitioned into P tone sets. Each tone set contains K tones. A tone set is assigned to each mobile unit within a given sector of a particular cell. In a given sector, the relationship between the number of tones (N) and the number of tone sets (P) is as follows:

$$N = P \times K \qquad (1)$$

For example, if 1280 tones are distributed across the frequency band, then for a given sector, the tones may be further divided into 80 tone sets which each include 16 tones. The 16 tones assigned to each tone set within a sector are totally different from the 16 tones contained within every other tone set within the sector thereby making the tone sets within the sector orthogonal to one another. Preferably, the tones within each tone set are approximately uniformly distributed in the frequency band so that frequency diversity is achieved for each tone set.

Tone sets are assigned in adjacent sectors using the same N tones. However, the tone sets in adjacent sectors, whether they are in the same or different cells, are selected so that no tone set within any given sector has all of the same K tones as any tone set within an adjacent sector. In accordance with the invention, each sector is assigned P tone sets chosen so that each tone set has at most X tones in common with any tone set in any adjacent sector, $0 < X < K$. A consideration in determining the value of X is the amount of interference which will result from the commonality of tones. In preferred embodiments, tone sets in adjacent sectors have no more than one tone in common, i.e., $X = 1$. Moreover, in a typical cellular system, a plurality of adjacent cellular regions, e.g. 16 adjacent cells or 48 adjacent sectors, would contain tone sets having at most X tones in common.

In determining the maximum number of tone sets which can be used in each sector, a number of factors must be taken into consideration. Among these factors are the bandwidth of the frequency band, the spacing between tones within the frequency band, the number of tones per tone set and the number of common tones permitted per sector and in adjacent sectors. In the preferred embodiment, tone sets within a sector have no tones in common and tone sets in adjacent sectors have no more than one tone in common.

In accordance with a method for implementing the invention, a series of up to P matrices $A^{(r)}$, $r = 0 \ldots P-1$, are created in which each matrix represents the collection of tone sets used in a particular sector. Within each matrix (i.e., within each sector), no two tone sets have any tones in common. Moreover, for any given tone set within any given matrix, the number of common tones does not exceed X. An exemplary method of deriving tone sets in accordance with this method in which $X = 1$ is described below. The matrix $M^{(r)}$ is comprised of i rows, $0 \leq i \leq (P-1)$, each row defining the tones contained in a particular one of P tone sets and j columns, $0 \leq j \leq (N-1)$. A tone contained in a particular tone set is indicated by a "1" and tones not contained in the tone set are indicated by "0". In accordance with the present invention, tone sets associated with any particular rth sector can have no tones in common. Therefore, in any given column there should be only one "1". An example of a $P \times N$ matrix for a first sector ($r = 1$) in which $P = 3$, $K = 3$, and $N = 9$ is shown below:

$$A^{(1)} = \begin{bmatrix} 1 & 0 & 0 & 0 & 1 & 0 & 0 & 0 & 1 \\ 0 & 1 & 0 & 0 & 0 & 1 & 1 & 0 & 0 \\ 0 & 0 & 1 & 1 & 0 & 0 & 0 & 1 & 0 \end{bmatrix} \qquad (2)$$

The above matrix can also be represented in a shorthand form as a $P \times K$ matrix in which each row represents a particular tone set, and each value in the row represents the index of a particular tone (out of the N tones) contained in that particular tone set. (The tone may be, but need not be, numbered in order of increasing frequency.) The number of columns included in the matrix can be limited to the number of tones, namely, K, contained in each tone set. The shorthand or $P \times K$ matrix for $A^{(1)}$ is as follows:

$$M^{(1)} = \begin{bmatrix} 0 & 4 & 8 \\ 1 & 5 & 6 \\ 2 & 3 & 7 \end{bmatrix} \quad (3)$$

In accordance with the above requirements, subsequent matrices, created for other sectors can only contain tone sets having at most one tone in common with any of the tone sets contained in any adjacent sector. However, within each subsequent matrix none of the tone sets can contain any common tones. As such, continuing with the above example, a $P \times N$ matrix and a $P \times K$ matrix for a second sector (r=2) of tone sets is shown below:

$$A^{(2)} = \begin{bmatrix} 1 & 0 & 0 & 0 & 0 & 1 & 0 & 1 & 0 \\ 0 & 1 & 0 & 1 & 0 & 0 & 0 & 0 & 1 \\ 0 & 0 & 1 & 0 & 1 & 0 & 1 & 0 & 0 \end{bmatrix} \quad (4)$$

$$M^{(2)} = \begin{bmatrix} 0 & 5 & 7 \\ 1 & 3 & 8 \\ 2 & 4 & 6 \end{bmatrix} \quad (5)$$

As can be seen from $M^{(2)}$, none of the tone sets within the second sector include common tones. Moreover, as between each tone set in $M^{(1)}$ and $M^{(2)}$, no tone set has more than one tone in common.

Each $P \times K$ matrix for an rth sector is created in accordance with the following relationships:

$$M^{(r)} = C + S^{(r)} \quad (6)$$

where $M^{(r)}$ = Matrix of tone sets
C = a matrix of constant value where each element, $C_{ij}$, i=0, ... P−1, j=0 ... K−1 is defined as $C_{i,j} = (j=1)P$, or:

$$\begin{bmatrix} 0 & P & 2P & \ldots & (K-1)P \\ 0 & P & 2P & \ldots & (K-1)P \\ . & . & . & \ldots & . \\ . & . & . & \ldots & . \\ . & . & . & \ldots & . \\ 0 & P & 2P & \ldots & (K-1)P \end{bmatrix}$$

$S^{(r)}$ = an offset matrix where each element, $S^{(r)}_{ij}$, i=0 ... P−1, j=0 ... K−1 is defined as $S^{(r)}_{ij} = ((rj+i))_{mod\,P}$ As defined by the above equation, the number of tone sets, i.e., the value of P, may be equal to any prime number, e.g., 83. Even more generally, P may be taken to be any power of a prime number, e.g., $81 = 3^4$, in which case C is defined as above and $S^{(r)}$ is defined by analogous operations over the so-called Galois field of P elements. However, the number of tone sets actually utilized in the sector can be equal to any desired number less than or equal to P, e.g., 80. The matrix C is comprised of elements which have constant values. The C matrix is advantageously arranged so that the elements contained in each column have a value equal to the product of P and j. For example, each element in the first column is labelled 0 indicating a zero value since $P \times 0 = 0$. The next column (1) contains elements each having a value of P since $P \times 1 = P$. Values for elements contained in each subsequent column are determined in the same manner.

By arranging the C matrix in this manner, the values derived for the elements of $M^{(r)}$ are arranged so that each column of $M^{(r)}$ contains a subset of the N tones used to derive the tone sets. More specifically, the first subset contains tones having sequential values 0, 1, ... , P−1. Each subsequent subset contains P tones having sequential values which are greater than the values in the first set by the value of the product of P and j. By arranging the constant matrix C in this manner, verification that the tone sets derived for adjacent sectors meet the required relationships, e.g., X=1, can be observed more easily since the same tone elements are always maintained in the same column. For example, by looking at the shorthand matrices for $M^{(1)}$ and $M^{(2)}$ above, it can be seen that the elements 0,1,2 are always in the j=0 column the elements 3,4,5 in the j=1 column, and elements 6,7,8 in the j=2 column. Continuing with the above example in which N=9, K=3 and P=3, the C matrix is as follows:

$$C = \begin{bmatrix} 0 & 3 & 6 \\ 0 & 3 & 6 \\ 0 & 3 & 6 \end{bmatrix} \quad (7)$$

The offset matrix $S^{(r)}$ has all its entries in the range 0, 1, ..., P−1, since for each row i and each column j, the corresponding element is equal to rj+i modulo P. That is, the element $S^{(r)i,j}$ is equal to the remainder obtained when (rj+i) is divided by P. In order to derive a matrix of the type in Eqn. (3), the value of each pair of i,j coordinates contained in a matrix for an rth sector must be substituted into Eqn. (5) to create the matrix.

For example, taking the $M^{(2)}$ matrix (r=2) defined in Eqn. (4), the following illustrates how the values in the matrix are derived:

$$M^{(2)}_{0,0} = (3)(0) + ((2(0)+0))_{mod\,3} = 0 \quad (8)$$

$$M^{(2)}_{0,1} = (3)(1) + ((2(1)+0))_{mod\,3} = 5 \quad (9)$$

$$M^{(2)}_{0,2} = (3)(2) + ((2(2)+0))_{mod\,3} = 7 \quad (10)$$

$$M^{(2)}_{1,0} = (3)(0) + ((2(0)+1))_{mod\,3} = 1 \quad (11)$$

$$M^{(2)}_{1,1} = (3)(1) + ((2(1)+1))_{mod\,3} = 3 \quad (12)$$

$$M^{(2)}_{1,2} = (3)(2) + ((2(2)+1))_{mod\,3} = 8 \quad (13)$$

$$M^{(2)}_{2,0} = (3)(0) + ((2(0)+2))_{mod\,3} = 2 \quad (14)$$

$$M^{(2)}_{2,1} = (3)(1) + ((2(1)+2))_{mod\,3} = 4 \quad (15)$$

$$M^{(2)}_{2,2} = (3)(2) + ((2(2)+2))_{mod\,3} = 6 \quad (16)$$

If the maximum allowed number of common tones between tone sets in adjacent sectors (K) is two or more, one method of creating the corresponding matrices for each sector would be to divide the complete set of N tones into X subsets, and treat each subset essentially as its own set. For example, if it were desired that tone sets within each sector have no tones in common, but that tone sets in adjacent tone sectors could have up to three tones in common, a matrix could be set up comprising three subsets of columns. Each subset would contain one third of the total of N tones. Likewise the number of K tones per tone set would be divided by three. Each user would be assigned K/3 tones from each of the three N/3-tone subsets. Tone combinations for each tone subset are determined in the manner described above. As in the above example, for a given sector tone sets have no tones in common. For tone sets in adjacent sectors, up to three tones may be in common. More specifically, up to one tone from each subset may be in common.

For any arbitrary value of X, given that X is a divisor of K, it follows that X is also a divisor of N, which equals PK. Then the N tones can be divided into X subsets of N' tones each, where N'=N/X. Each tone set can be similarly divided into X subsets of K' tones each, where K'=K/X. Within each subset, the tones are assigned as before, with K' replacing K and N' replacing N, where $$N' = PK' = P\left(\frac{K}{X}\right) \tag{17}$$

Figure 3:
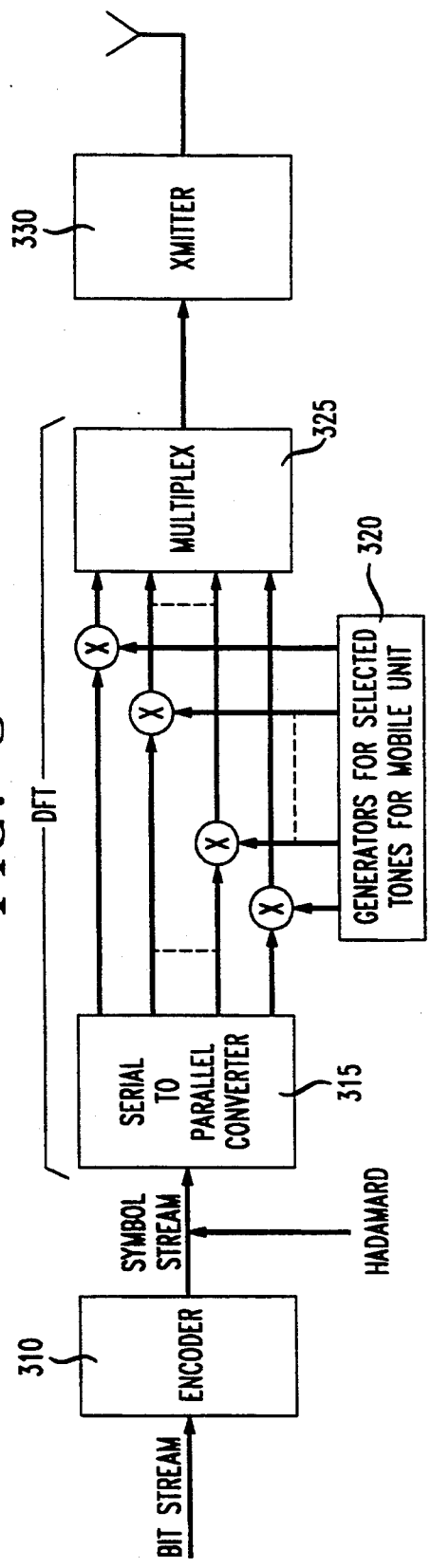
FIG. 3 is an illustrative block diagram of a multi-tone CDMA mobile unit for transmitting information signals to a base station within a cell in accordance with the present invention.

FIG. 3 is a schematic diagram of a MT-CDMA mobile unit 300 for transmitting information signals in the reverse link direction in accordance with the present invention. A serial bit stream of binary signals is transmitted to an encoder 310 which converts the signals into a serial data symbol stream. The encoder 310 encodes the signals for noise and interference protection. The symbol stream for each mobile unit is multiplied by a Hadamard matrix which causes the symbol stream to appear approximately Gaussian. The same Hadamard matrix can be applied to the symbol streams transmitted by each mobile unit or a different Hadamard matrix can be applied to each symbol stream. The Hadamard matrix causes interference resulting from overlapping of tones in tone sets assigned to the different mobile units to be spread among the entire tone set, thereby reducing the amount of interference at any single tone.

The symbol stream is received by a serial to parallel converter 315 which converts the single serial symbol stream from the mobile unit into a plurality of separate parallel symbol streams such that each stream transmits a single symbol at a time. In the preferred embodiment, K parallel symbol streams are created corresponding to the K tones within each tone set. A generator 320 generates the K tones comprised in the tone set assigned to the transmitting mobile unit 300. Each generated tone modulates a symbol in a different one of the parallel symbol streams being transmitted. The symbols are preferably modulated using standard modulation techniques such as, but not limited to, amplitude modulation, binary phase shift key (BPSK) signaling, QPSK or M-ary PSK signaling. The modulated symbols are combined by a multiplexor 325. The combination of the serial to parallel converter 315, generator 320 and multiplexor 325 essentially perform a Discrete Fourier Transform (DFT) on the block of data symbols. The combined symbols are transmitted by a transmitter 330 to a base station (not shown) via a transmitting antenna 335.

It is to be understood by those skilled in the art that all of the mobile units within the system operate in a manner similar to the mobile unit 300 described above. Each mobile unit, however, is assigned a different tone set by the base station for transmission of signals.

In the preferred embodiment, the transmitter 330 transmits the symbols every T seconds, where T=1/Δ and Δ is the separation between each of the N tones. The separation between the N tones can also be expressed as follows:

$$\Delta = \frac{W}{N} \tag{18}$$

The degree of separation between tones can be any suitable value which allows for an adequate number of tones in the frequency band and which also minimizes the amount of interference produced by adjacent tones. In the above example, the separation between tones is approximately 1 KHz. The encoded data symbols for transmission by the mobile unit 300 take the form of a series of rectangular pulses. Each pulse is of duration T and amplitude ±1.

Figure 4:
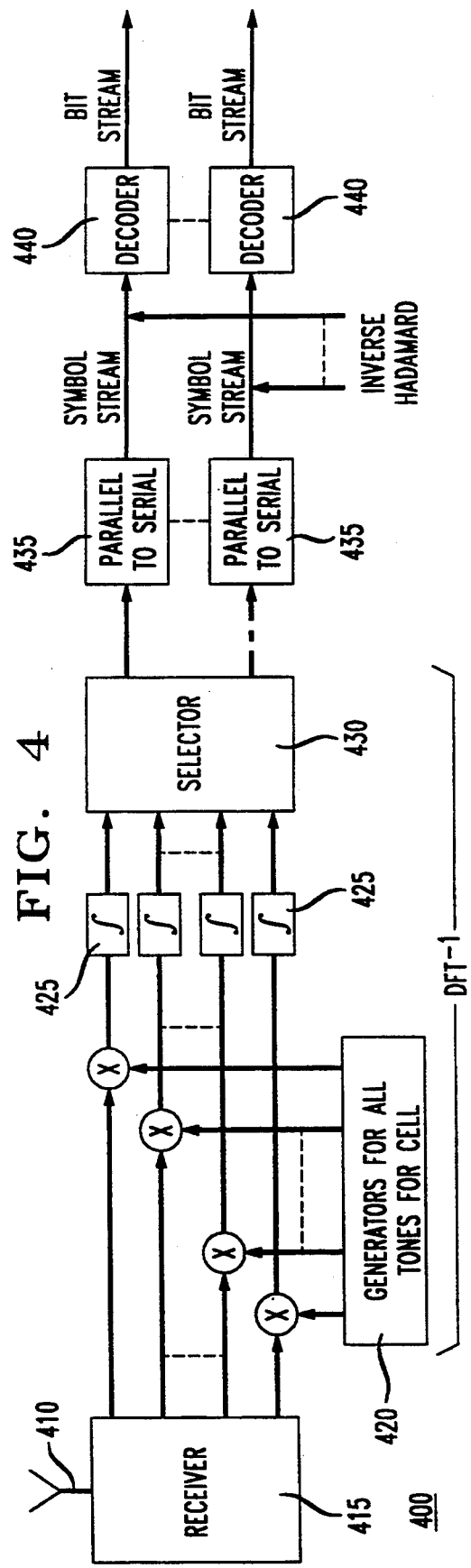
FIG. 4 is an illustrative block diagram of a multi-tone CDMA base station for receiving the information signals transmitted in FIG. 2.

FIG. 4 illustrates a MT-CDMA base station 400 for receiving the modulated symbols transmitted by the mobile units within a sector in accordance with the present invention. The modulated symbols transmitted by the mobile units are received by a directional antenna 410. Each branch of the antenna 410 monitors the reception of signals from all of the mobile units in a given sector. Included in the received modulated symbols is noise. The noise is typically a white Gaussian noise with one-sided spectral density To which includes the noise generated by interference from tone sets assigned to neighboring sectors. Because the tones in each tone set are generally orthogonal, there is generally no interference produced from the tone sets of mobile units located in the same sector.

The symbols from each transmitting mobile unit in the sector are received by a receiver 4 15. The receiver applies a bandpass filter to the symbols which limits the bandwidth of the demodulated symbols and computes a baseband signal. The bandpass filter preferably passes signals which are in a lower frequency range and removes all high frequency signals. Each symbol is then sampled by one of N symbol streams. A generator 420 generates each of the N tones in the transmitting frequency band. The tones are combined with the parallel symbol streams by an integrator 425 to demodulate the signals. The N symbols are then transmitted to a selector 430 which selects K symbols modulated by tones assigned to the same tone set. The selector 430 preferably retrieves the tone set information from a look-up table contained in memory (not shown) associated with the base station 400. The combination of the generator 420, integrator 425 and selector 430 perform an inverse DFT on the block of symbols.

The K symbols are transmitted to a parallel to serial converter 435 which converts the K parallel symbol streams to a single symbol stream which contains the information signals for a particular mobile unit. An inverse Hadamard matrix is applied to each symbol which separates the symbols from noise. The inverse Hadamard matrix also limits the amount of multiple access interference between mobile units by smearing the interferences caused by overlapping tones. A decoder 440 decodes the symbols into a binary bit stream similar to the bit stream originally transmitted by the particular mobile unit.

If the mobile unit travels from one sector to another sector a handoff procedure is performed to assign a new tone set to the mobile unit. It is to be understood by those skilled in the art that any known handoff procedure can be used. The handoff procedure occurs between adjacent sectors within a cell as well as between sectors in adjacent cells.

The foregoing merely illustrates the principles of the invention and it will thus be appreciated that those skilled in the art will be able to devise numerous alternative arrangements which, although not explicitly described herein, embody the principles of the invention and are within its scope and spirit.

We claim:

1. In a multi-tone cellular system having a plurality of cellular regions in which signals from mobile units are transmitted by modulating tone sets in a frequency band, a method of assigning the tone sets to be used in each region comprising the steps of:
   selecting a plurality of spaced tones within the frequency band;
   partitioning said tones into said tone sets such that the tones within each tone set are distributed within the frequency band, each tone set comprising K tones; and
   assigning each tone set to a user so that tone sets assigned to adjacent cellular regions have at most X tones in common, $0<X<K$.

2. The method according to claim 1 wherein $X=1$.

3. The method according to claim 1 wherein each cellular region is a sector.

4. The method according to claim 1 wherein tone sets assigned to the same cellular region have no tones in common.

5. The method according to claim 1 wherein each tone set assigned to the same cellular region has Y tones in common, $0<Y<K$.

6. The method according to claim 5 wherein $Y=0$.

7. The method according to claim 1 wherein $K=16$.

8. In a multi-tone cellular system having a plurality of cellular regions, a method of transmitting signals from a plurality of mobile units to at least one base station, comprising the steps of:
   assigning each mobile unit a tone set comprising a plurality of K tones selected from a frequency band, each tone set having at most X tones in common, $0<X<K$,
   modulating each assigned tone set with said signals transmitted by said assigned mobile unit, and
   transmitting said modulated signals to said base station.

9. The method according to claim 8 wherein the tones of said tone set are distributed across the frequency band.

10. The method according to claim 8 wherein each cellular region is a sector.

11. The method according to claim 10 wherein said assigning step further comprises the steps of:
    assigning a first group of tone sets to each mobile unit within a first sector of a cell-site; and
    assigning a second group of tone sets to each mobile unit within a second sector of the cell-site, wherein each tone set in the first group of tone sets has at most X tones in common with any tone set within the second group of tone sets, $0<X<K$.

12. The method according to claim 11 wherein $X = 1$.

13. The method according to claim 11 wherein $K=16$.

14. A multi-tone code division multiple access system for transmitting signals from a plurality of transmitters in an allocated frequency band to a receiver comprising:
    means for assigning a set of K tones to each transmitter, said tone sets having at most X tones in common, $0<X<K$.
    means for modulating said tones in accordance with said signals transmitted by each transmitter,
    means for transmitting said modulated signals to said receiver,
    means for demodulating the received modulated signals, and
    means for simultaneously recovering the signals transmitted by the transmitters from the received modulated signals.

15. The system according to claim 14 wherein said system is a cellular system comprising a plurality of adjacent cells, each cell comprising a predetermined number of sectors.

16. The system according to claim 15 Wherein said tone set assigned to each transmitter is determined by the sector in which the transmitter is located.

17. The system according to claim 16 wherein tone sets assigned in adjacent sectors have X tones in common.

18. The system according to claim 17 wherein $X=1$.

19. The system according to claim 16 wherein tone sets assigned in the same sector have no tones in common.

20. The system according to claim 14 wherein $K=16$.

* * * * *